United States Patent [19]

Miller et al.

[11] Patent Number: 4,678,490
[45] Date of Patent: Jul. 7, 1987

[54] APPARATUS FOR FORMING FIBERS

[75] Inventors: Charles H. Miller; Kunihiko Takeuchi, both of Newark; Paul A. Goodridge, Granville, all of Ohio

[73] Assignee: Owens-Corning Fiberglas Corporation, Toledo, Ohio

[21] Appl. No.: 791,000

[22] Filed: Oct. 24, 1985

[51] Int. Cl.⁴ .............................................. C03B 37/04
[52] U.S. Cl. ............................................ 65/14; 65/6; 425/7; 425/8
[58] Field of Search ................. 65/5, 6, 14, 16; 264/8, 264/12; 425/7, 8

[56] References Cited

U.S. PATENT DOCUMENTS

| | | | |
|---|---|---|---|
| 3,215,514 | 11/1965 | Levecque et al. | 65/14 X |
| 3,295,943 | 1/1967 | Mabru | 65/6 |
| 3,532,479 | 2/1970 | Stalego | 65/16 |
| 3,560,179 | 2/1971 | Kleist | 65/14 |
| 3,785,791 | 1/1974 | Perry | 65/14 |
| 4,106,921 | 2/1978 | Porter | 65/14 |
| 4,497,644 | 2/1985 | Kaveh | 65/14 |
| 4,534,779 | 8/1985 | Herschler | 65/6 |

Primary Examiner—Ronald C. Hudgens; Ted C.
Attorney, Agent, or Firm—Ronald c. Hudgens; Ted C. Gillespie; Thomas F. McGann

[57] ABSTRACT

An annular blower which has an internal baffle. The blower is used to attenuate glass fibers centrifuged from a spinner in a rotary fiberizer process. The internal baffle directs and uniforms gas flow in the blower and decreases turbulent flow conditions in the gas flowing from the periphery of the blower.

12 Claims, 11 Drawing Figures

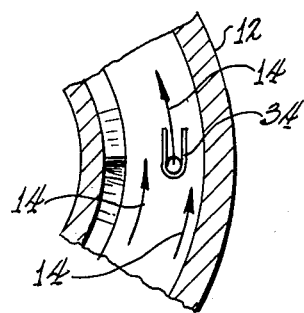
FIG.5A
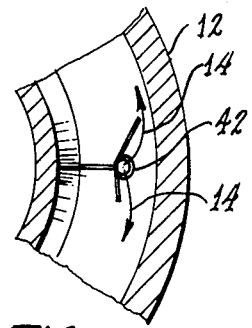
FIG.5E
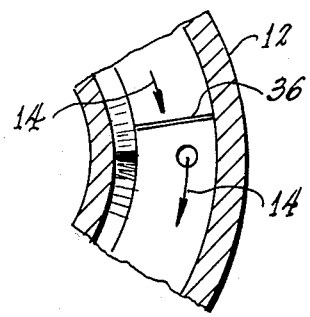
FIG.5B
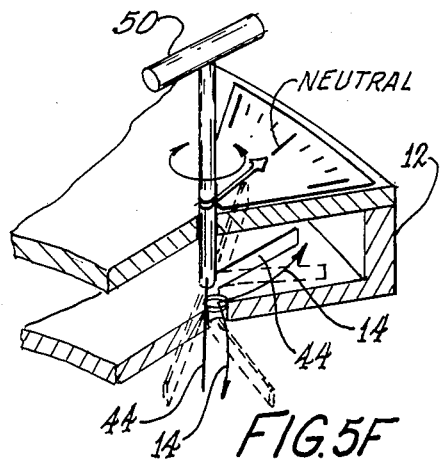
FIG.5F
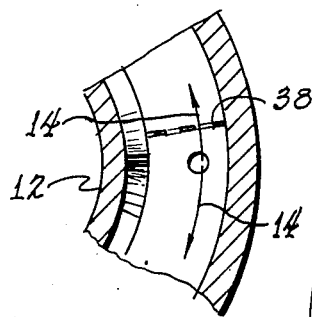
FIG.5C
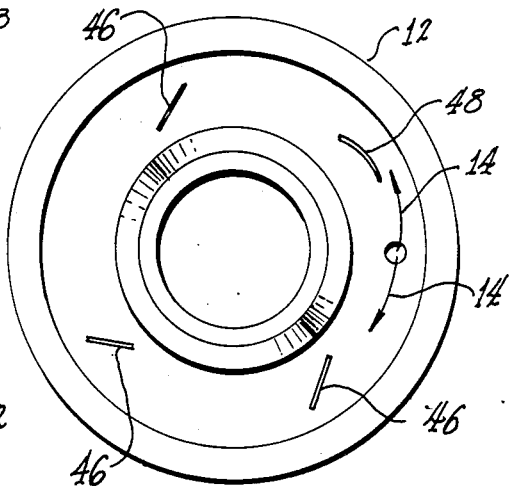
FIG.5G
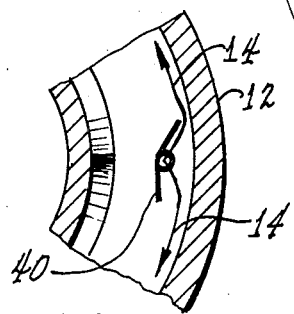
FIG.5D
FIG.5

APPARATUS FOR FORMING FIBERS

TECHNICAL FIELD

This invention pertains to blowers for pneumatically influencing fibers. In one of its more specific aspects, this invention pertains to annular blowers suitable for attenuating fibers that have been centrifuged by a rotating spinner from a liquid. A particular application for this invention is in the attenuation of glass fibers.

BACKGROUND OF THE INVENTION

Methods and apparatus for forming glass fibers in a rotary fiberizer process are well-known. In general, a molten glass stream is fed into a spinner which revolves at high speed. The spinner has a substantially open top, a circumferential side wall containing a plurality of holes, and a substantially solid bottom surface. As the spinner revolves, molten glass is centrifuged through the holes in the side wall, forming fibers.

Positioned circumferentially around the outside of the spinner is an annular blower which typically comprises an annular casing defining an annular chamber, a gas inlet port for supplying a gas to the annular chamber, and an annular gas outlet port on the inside circumference of the blower from which port gas emerges to pneumatically influence the centrifuged (primary) fibers. This pneumatic influence involves attenuating the primary fibers to form the final (secondary) fibers of smaller diameter than the primary fibers. The attenuation is accomplished through the drag force imparted to the primary fibers by the gas from the blower.

The outlet port is shaped to direct the gas in a substantially downward direction so that the primary fibers are turned downward, and the secondary fibers formed are inherently arranged into a downwardly moving annular array or veil. The major axis of this veil substantially coincides with the axis of rotation of the spinner. The outlet port usually comprises a series of discrete slots equally spaced around the inside circumference of the blower. The gas used is usually air, supplied by an air compressor.

The pneumatic influence may be confined to turning the primary fibers downward where no attenuation into secondary fibers is desired.

Annular blowers may be used for other purposes in the glass fiber forming process. As an example, it may be desirable to control the shape or movement of the veil as it descends downward from the spinner.

In any fluid flow device, energy losses occur between the fluid inlet and fluid outlet points. These losses are exacerbated if turbulent flow is present. In a conventional annular blower, a jet of gas flows from each slot in the blower annular outlet port, and a sole gas inlet port supplies the gas to the manifold. Accordingly, gas flows concurrently in both clockwise and counterclockwise directions in the annular chamber and turbulent flow conditions in the annular chamber result. Energy losses are excessive, and jet velocities fluctuate and are disparate jet-to-jet. These turbulent jet flow conditions cause the microstructure of a fiber to vary along the length of the fiber, resulting in a weaker fiber than is formed by a laminar flow jet. Additionally, fiber attenuation efficiency is higher with laminar flow jets than with turbulent flow jets.

The effect of two-directional flow is particularly evident at the confluence of the clockwise and counterclockwise flows at the location diametrically opposite the gas inlet port. Turbulence at this confluence is high, and discrete jet velocities are low and variable. The jet velocity profile at the confluent circumferential segment of the blower shifts to-and-fro in an oscillating (dancing) fashion. Fiber veils bulge, part, and dance in response to the confluent influence. Variations in pneumatic influence on primary fibers can result in production of an undesirably wide range of secondary fiber diameters and a malformed or badly controlled fiber veil. Even with a substantially continuous slot, two-directional flow can result in flow velocity disparities and turbulence detrimental to forming uniform fibers and to fiber veil shape and veil control.

This invention provides the means to uniform blower jet velocities and secondary fiber diameters, minimize fluid turbulence in the annular chamber, control the jet velocity profile, minimize energy consumption, and control the shape and oscillation characteristics of the fiber veil.

STATEMENT OF THE INVENTION

According to this invention, there is provided an annular blower for pneumatically influencing fibers which comprises an annular casing defining an annular manifold, a gas outlet port, and a baffle in the annular chamber to direct most of the gas in one circumferential direction in the annular chamber, thereby minimizing turbulence and velocity fluctuations in gas flow from the outlet port around the circumference of the blower.

In one embodiment of the invention, the outlet port is a substantially continuous slot.

In the preferred embodiment of the invention, the outlet port is a series of slots.

In the preferred embodiment of the invention, the baffle directs all gas flow in one circumferential direction.

In the preferred embodiment of the invention, the unidirectional baffle allows gas to flow past the baffle as a circumferential circuit is completed.

In another embodiment of the invention, the baffle is adjustable to permit flow over a range of from all in one circumferential direction to all in the opposite circumferential direction.

In another embodiment of the invention, the baffle allows flow in one direction only and allows no flow past the baffle as a circumferential circuit is completed.

In the preferred embodiment of the invention, the baffle is keyed to the inlet port for location purposes.

In another embodiment of the invention, vanes are employed in the manifold to direct and uniform gas flow.

DESCRIPTION OF THE DRAWINGS

FIGS. 5a, 5b, 5c, 5d, 5e, 5f, and 5g are plan views of additional baffle embodiments.

DESCRIPTION OF THE INVENTION

This invention is described in terms of a process for manufacturing glass fibers. The invention is suitable for use in processes for manufacturing fibers from other materials as well, particularly inorganic materials such as rock, slag and basalt. The invention is described in terms of the best mode without meaning it to be limited thereto.

Figure 1:
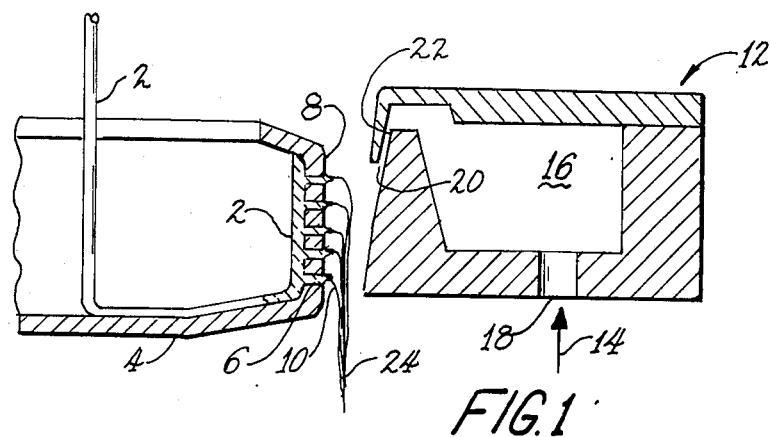
FIG. 1 is a schematic cross-sectional elevation view of a conventional spinner and blower.
Figure 2:
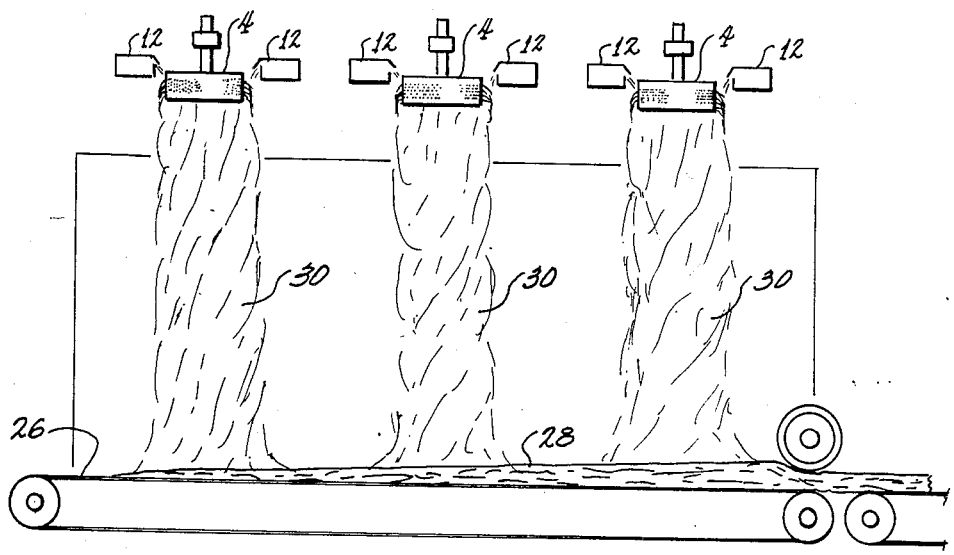
FIG. 2 is a schematic elevation view of a conventional spinner, blower and forming chain showing the forming and collection of a fiber veil.

As shown in FIGS. 1 and 2, a stream of molten glass 2 is fed into spinner 4 which revolves at high speed. The molten glass is caused by centrifugal force to pass through holes 6 in spinner circumferential side wall 8 forming primary fibers 10.

An annular blower comprising a casing 12 defining an annular chamber 16 is positioned circumferentially around the spinner. Gas flow 14 is supplied to the annular chamber 16 through gas inlet port 18. Gas emerges from the blower through circumferential gas outlet port 20. This outlet port preferably comprises a series of discrete slots 22 and is shaped to direct the gas in a substantially downward direction. When the outlet port comprises discrete slots, the gas flow will initially be in the form of discrete jets. Other types of outlet port openings, such as a continuous slot, may be used. The gas impinges the primary fibers, turning them downward, attenuating the primary fibers into secondary fibers 24, and urging the secondary fibers toward forming chain 26 where they are collected into pack 28. The preferred gas is air, although other types of gas such as steam may be used.

Because of the annular shapes of the spinner side wall and the blower gas outlet port, the secondary fibers are inherently arranged into annular veil 30. This veil is a dynamic array, continuously travelling downward as a secondary fibers are generated from primary fibers by the gas emanating from the blower as outlet port.

Figure 3:
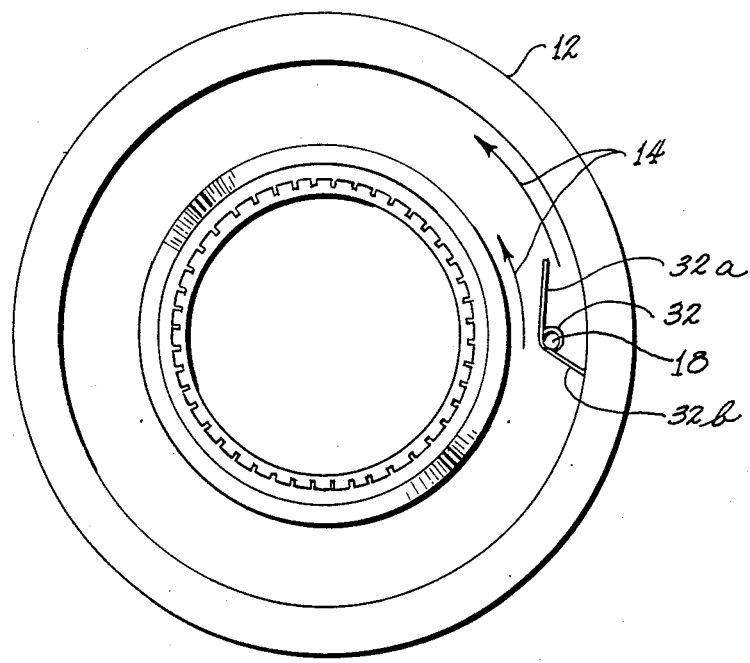
FIG. 3 is a plan view of a blower with the baffle of the invention installed, and blower top removed.
Figure 4:
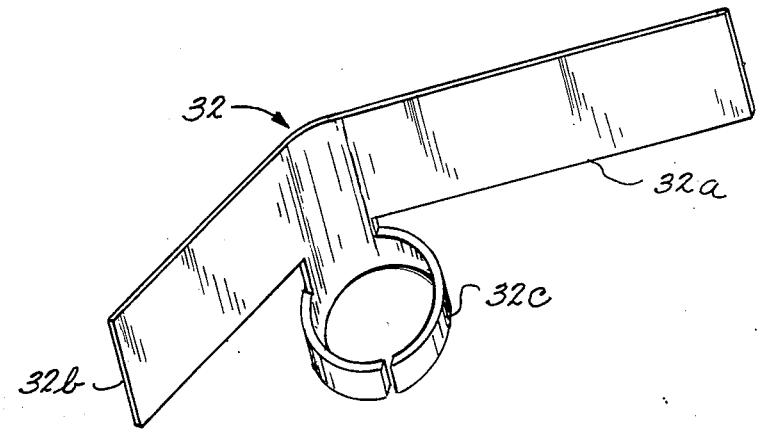
FIG. 4 is a perspective view of the baffle.

Although it can be located anywhere in the annular chamber, angular unidirectional bypass baffle 32 as shown in FIGS. 3 and 4 is preferably located at the situs of the gas inlet port and is shaped and positioned to cause gas to move substantially in a single direction, preferably in the circumferential direction in which the spinner is rotating. As the gas completes a circuit through the annular chamber, it will bypass the angular unidirectional bypass baffle and continue its circumferential course.

Although gas directing members such as baffles can be any shape, the angular unidirectional bypass baffle is preferably formed to have a long leg 32a, a short leg 32b, and a base 32c. The base can be made to be substantially the same shape as the gas inlet port and to fit loosely into the gas inlet port for location purposes. The downstream leg of the baffle is the longer of the two legs so that the baffle will rotate in the gas inlet port and thrust the upstream (and shorter) leg against the inside of the casing 12 to effect substantially unidirectional gas flow in the annular chamber.

It may be useful to locate additional baffles in the annular chamber to function as vanes. These vanes, straight 46 or arcuate 48, shown in FIG. 5g, may be used to direct and uniform gas flow in the annular chamber, minimize turbulence, and adjust the jet velocity profile around the circumference of the blower.

The height of the baffles is generally the same as the height of the annular chamber, but preferably with a small clearance between the top of the baffle and the top of the chamber to allow the baffle to rotate into the working position. The baffles are shaped generally to conform to the cross-sectional shape of the annular chamber, where it is desired to inhibit the gas from flowing between the baffle and the casing. For example, in the preferred embodiment shown in FIG. 3, the legs of the baffle conform substantially to the upper and lower surfaces of the annular chamber, and the end of the short leg conforms substantially to the sidewall of the casing so that the gas can flow in only one direction. The gas is inhibited from flowing over, under, or around the short leg, and over or under the long leg.

Examples of other possible baffle embodiments are shown:

FIG. 5a shows a horseshoe unidirectional bypass baffle 34 which permits unidirectional gas flow to flow past the baffle as a circumferential circuit through the annular chamber is completed.

FIG. 5b shows a solid unidirectional baffle 36 which prohibits unidirectional gas flow from flowing past the baffle as a circumferential circuit through the annular chamber is completed.

FIG. 5c shows a foraminous bidirectional baffle 38 which permits regulation of the ratio of volumes of clockwise to counterclockwise gas flows by selection of baffle foramity.

FIG. 5d shows an angular bidirectional bypass baffle 40 which permits regulation of the ratio of volumes of clockwise to counterclockwise gas flows by selection of angular relationship of baffle legs, and orientation of baffle in the annular chamber, and permits gas flow in either circular direction past the baffle.

FIG. 5e shows an angular bidirectional baffle 42 which does not permit gas flow past the baffle.

FIG. 5f shows an adjustable angular baffle 44 which permits changing the orientation of the baffle in the annular chamber with a through-blower adjustment device such as shaft-and-handle 50 without disassembling the blower to access the baffle.

FIG. 5g shows two vane baffles, straight 46 and arcuate 48, which permit smoothing the gas flow in the annular chamber.

It can be seen that various combinations of baffle embodiments may be useful in controlling fiber forming and veil shape and oscillation. For example, vane baffles may be used alone or with other baffle embodiments, and the adjustable baffle fixture may be used with any bidirectional baffle or the vane baffles.

It is possible to fix, such as by welding, the short leg of the angular unidirectional bypass baffle to the inside of the casing so as not to depend on gas flow influence to rotate the baffle and hold the short leg against the casing. It can be seen that unidirectional baffles can be shaped to direct gas flow in either circumferential direction.

It is evident from the foregoing that various adjustments and modifications can be made to the apparatus of this invention. Such, however, are within the scope of the invention.

INDUSTRIAL APPLICABILITY

This invention will be found useful in the production of glass fibers for such uses as thermal insulation and acoustical insulation products.

We claim:

1. An apparatus for forming fibers from a liquid, said apparatus comprising:
   a. a rotatable spinner for generating fibers from a liquid supplied thereto, and
   b. an annular blower for pneumatically influencing fibers generated by said spinner, said blower comprising:

(1) an annular casing surrounding said spinner and defining an annular chamber;

(2) a gas inlet port in said casing for supplying a gas to said annular chamber, said gas when supplied normally tending along paths in said annular chamber in opposite arcuate directions from said inlet port whereby turbulence is generated in said annular chamber at a juncture of said paths diametrically opposite said inlet port;

(3) an annular gas outlet port in said casing in surrounding relationship to said spinner, said gas when supplied emerging from said gas outlet port to pneumatically influence said fibers, and (4) a baffle in said annular chamber directing at least a major portion of said gas in one arcuate direction in said annular chamber when gas is supplied to said inlet port and thereby reducing turbulence in said annular chamber.

2. The apparatus of claim 1 wherein said baffle is shaped to substantially conform to the cross-sectional shape of said annular chamber.

3. The apparatus of claim 1 wherein said annular gas outlet port is a substantially continuous slot.

4. The apparatus of claim 1 wherein said annular gas outlet port has a plurality of slots positioned substantially uniformly around said blower.

5. The apparatus of claim 1 wherein said baffle is located at the situs of said gas inlet port.

6. The apparatus of claim 5 wherein said baffle is fitted with a locating appendage which is shaped to substantially conform to the internal cross-sectional shape of said inlet port and to fit into said inlet port, thereby fixing the location of said baffle at said inlet port situs.

7. The apparatus of claim 1 wherein said baffle is adjustable to permit adjustment of the proportions of said gas flowing clockwise and counterclockwise directions in said chamber.

8. The apparatus of claim 7 wherein the range of said adjustment of said proportions of said gas flowing in said chamber is from substantially all in said clockwise direction to substantially all in said counterclockwise direction.

9. The apparatus of claim 1 wherein said baffle directs substantially all of said gas in one arcuate direction in said chamber.

10. The apparatus of claim 9 wherein said baffle permits said gas to flow past said baffle as said gas completes a circuit through said annular chamber.

11. The apparatus of claim 9 wherein said baffle substantially prevents said gas from flowing past said baffle as said gas completes a circuit through said annular chamber.

12. The apparatus of claim 1 further comprising at least one vane in said annular chamber to direct and render uniform the flow of said gas.

* * * * *